(12) United States Patent
Karayianni

(10) Patent No.: US 11,066,533 B2
(45) Date of Patent: Jul. 20, 2021

(54) LOW SMOKE HALOGEN FREE FLAME RETARDANT THERMOPLASTIC ELASTOMER COMPOSITIONS

(71) Applicant: DUPONT POLYMERS, INC., Wilmington, DE (US)

(72) Inventor: Eleni Karayianni, Geneva (CH)

(73) Assignee: DUPONT POLYMERS. INC., Wilmington, DE (US)

( * ) Notice: Subject to any disclaimer, the term of this patent is extended or adjusted under 35 U.S.C. 154(b) by 437 days.

(21) Appl. No.: 15/514,971

(22) PCT Filed: Sep. 29, 2015

(86) PCT No.: PCT/US2015/052844
§ 371 (c)(1),
(2) Date: Mar. 28, 2017

(87) PCT Pub. No.: WO2016/053976
PCT Pub. Date: Apr. 7, 2016

(65) Prior Publication Data
US 2017/0247529 A1 Aug. 31, 2017

Related U.S. Application Data

(60) Provisional application No. 62/058,179, filed on Oct. 1, 2014.

(51) Int. Cl.
| | | |
|---|---|---|
| C08K 3/016 | (2018.01) |
| C08K 3/22 | (2006.01) |
| C08K 5/523 | (2006.01) |
| C08K 5/3492 | (2006.01) |
| C08K 5/00 | (2006.01) |

(52) U.S. Cl.
CPC .............. C08K 3/016 (2018.01); C08K 3/22 (2013.01); C08K 5/0066 (2013.01); C08K 5/34922 (2013.01); C08K 5/34924 (2013.01); C08K 5/523 (2013.01); C08K 2003/2224 (2013.01); C08K 2003/2227 (2013.01); C08K 2201/019 (2013.01)

(58) Field of Classification Search
CPC ........ C08K 3/016; C08K 3/22; C08K 5/0066; C08K 5/34922; C08K 5/34924; C08K 5/523; C08K 2003/2224; C08K 2003/2227; C08K 2201/019
USPC ........................................................ 524/115
See application file for complete search history.

(56) References Cited

U.S. PATENT DOCUMENTS

| | | |
|---|---|---|
| 3,900,444 A | 8/1975 | Racky et al. |
| 4,036,811 A | 7/1977 | Noetzel et al. |
| 4,180,495 A | 12/1979 | Sandler |
| 4,180,496 A | 12/1979 | Yanagimoto et al. |
| 5,780,534 A | 7/1998 | Kleiner et al. |
| 6,013,707 A | 1/2000 | Kleiner et al. |
| 6,255,371 B1 | 7/2001 | Schlosser et al. |
| 6,270,560 B1 | 8/2001 | Kleiner et al. |
| 7,700,680 B2 | 4/2010 | Costanzi et al. |
| 7,790,790 B2 | 9/2010 | Karayianni et al. |
| 8,415,415 B2 | 4/2013 | Karayianni et al. |
| 8,781,278 B2 | 7/2014 | Karayianni |
| 2008/0023887 A1* | 1/2008 | Vollenberg ................ C08J 11/24 264/500 |
| 2011/0084242 A1 | 4/2011 | Kaminito et al. |
| 2011/0315423 A1 | 12/2011 | Karayianni |
| 2012/0225291 A1 | 9/2012 | Karayianni |
| 2013/0327558 A1* | 12/2013 | Karayianni ............ H01B 3/422 174/110 SR |
| 2016/0005505 A1 | 1/2016 | Keestra et al. |
| 2016/0009901 A1* | 1/2016 | Keestra .................... H01B 3/28 524/147 |

FOREIGN PATENT DOCUMENTS

| | | | | |
|---|---|---|---|---|
| CN | 103724946 A | * | 4/2014 | ............ B29C 48/91 |
| CN | 103724946 A | | 4/2014 | |
| CN | 103724949 A | * | 4/2014 | |
| CN | 104159973 A | | 11/2014 | |
| CN | 104334636 A | | 2/2015 | |
| CN | 106795362 B | | 11/2019 | |
| CN | 800540163 | | 11/2019 | |
| DE | 2252258 | | 5/1974 | |
| DE | 2447727 A1 | | 4/1976 | |
| EP | 0947547 A1 | | 10/1999 | |
| EP | 0846712 B1 | | 5/2000 | |
| EP | 1655741 A1 | | 5/2006 | |
| JP | 7-216144 A | | 8/1995 | |
| JP | 07216144 A | * | 8/1995 | |
| JP | 9-143350 A | | 6/1997 | |
| JP | 2001-329141 A | | 11/2001 | |
| JP | 2004-080281 A | | 3/2004 | |
| JP | 2006-271700 A | | 10/2006 | |
| JP | 2007-216144 A | | 8/2007 | |
| JP | 2009-114230 A | | 5/2009 | |
| JP | 2009-263597 A | | 11/2009 | |
| JP | 2010-198898 A | | 9/2010 | |
| JP | 2015-511646 A | | 4/2015 | |
| JP | 2015-525272 A | | 9/2015 | |
| JP | 2016-515150 A | | 5/2016 | |
| JP | 2016-516102 A | | 6/2016 | |
| WO | 92/20731 A1 | | 11/1992 | |
| WO | 2013/135377 A2 | | 9/2013 | |
| WO | 2013/135680 A1 | | 9/2013 | |
| WO | 2014/036870 A1 | | 3/2014 | |
| WO | 2014/036871 A1 | | 3/2014 | |
| WO | 2014/135377 A1 | | 9/2014 | |
| WO | 2014/135680 A1 | | 9/2014 | |

OTHER PUBLICATIONS

Machine Translation CN103724946.
Machine Translation JP7-216144.
Machine Translation JP9-143350.

* cited by examiner

Primary Examiner — Kelechi C Egwim

(57) ABSTRACT

Halogen-free flame retardant compositions comprising thermoplastic elastomers, which exhibit flame retardance and low-smoke emission. The flame retardant compositions comprise (a) one or more thermoplastic elastomers; and (b) a flame retardant mixture comprising: magnesium hydroxide, aluminium trihydrate, melamine cyanurate, and optionally a phosphate ester flame retardant.

13 Claims, No Drawings

LOW SMOKE HALOGEN FREE FLAME RETARDANT THERMOPLASTIC ELASTOMER COMPOSITIONS

CROSS-REFERENCES TO RELATED APPLICATIONS

This application claims priority under 35 U.S.C. § 371 to International Application No. PCT/US2015/052844, filed on Sep. 29, 2015, which in turn claims priority to U.S. Provisional Appln. No. 62/058,179, filed on Oct. 1, 2014, each of which is incorporated herein by reference in its entirety.

FIELD OF THE INVENTION

The present invention relates to the field of low smoke halogen free flame retardant compositions comprising thermoplastic elastomers.

BACKGROUND OF THE INVENTION

Several patents and publications are cited in this description in order to more fully describe the state of the art to which this invention pertains. The entire disclosure of each of these patents and publications is incorporated by reference herein.

The design flexibility afforded by many thermoplastic resin compositions, their relative light weight and corrosion resistance make them attractive materials for many uses, including the replacement of metal components in many applications including motor and recreational vehicles, appliances, tools, electronics, furniture, and toys. However, in the construction, furniture, transport or electrical/electronic industries, thermoplastic resin compositions are preferably made flame retardant to promote product safety, prevent the spread of fire and reduce destruction of products exposed to fire. The conventional practice of imparting flame retardance to thermoplastic resin compositions has been the addition of one or more flame retardants or a flame retardant mixture, which typically include a halogenated organic compound such as brominated polystyrene as the flame retardant and an antimony compound as a synergist for the retardant.

However, halogenated flame retardants tend to decompose or degrade at the processing temperatures of thermoplastic resins, which implicates potential health and environmental effects due to the gases that are released. Consequently, there has been a trend away from using halogenated compounds or mixtures containing them to impart flame retardance.

Another conventional approach to impart flame retardance to thermoplastic resin compositions has been the addition of red phosphorus. Intl. Pat. App. Pub. No. WO 92/20731 discloses a composition comprising an elastomer, a flame retardant comprising red phosphorus and ammonium polyphosphate as a flame retardant synergist. Moreover, the use of fine red phosphorus powder homogeneously dispersed in the resin is known and practiced. In addition to the hazards of fire and explosion related to handling fine red phosphorus powders, the very combustion of red phosphorus causes the emission of toxic fumes due to the formation of phosphine.

To avert the hazards of using halogenated flame retardants and red phosphorus, phosphinate salts, that is, salts of phosphinic acids, also known as phosphinates, have been substituted in thermoplastic resin compositions. DE Pat. Nos. 2,252,258 and 2,447,727 disclose phosphinates used as flame retardants. U.S. Pat. No. 4,180,495 discloses the use of poly(metal phosphinate) salts in flame retardant polyesters and polyamides. U.S. Pat. No. 6,255,371 discloses flame retardant compositions comprising a) phosphinates, diphosphinates, or polymers of these and b) condensation products of melamine, reaction products of melamine with phosphoric acid, reaction products of condensation products of melamine with phosphoric acid and/or mixtures of these. U.S. Pat. No. 6,270,560 discloses salt mixtures made from aluminum phosphinates, aluminum hydroxide, aluminum phosphonates and/or aluminum phosphates suitable as flame retardants for polymeric molding compositions. U.S. Pat. Nos. 5,780,534 and 6,013,707 disclose flame retardant polyester compositions containing calcium or aluminum salts of phosphinic acid or disphosphinic acid.

A disadvantage of using halogen-free, flame retardant compositions is that, upon exposure to flame, such compositions emit a high level of smoke, which can cause smoke inhalation hazards severe enough to require evacuation of the workplace. Therefore, a need remains for halogen-free, flame retardant compositions comprising thermoplastic elastomers which exhibit the desired flame retardance as well as low smoke emission properties.

SUMMARY OF THE INVENTION

The present invention is directed to flame retardant polymer compositions comprising:
  a) one or more thermoplastic elastomers; and
  b) a flame retardant mixture comprising:
    b1) Magnesium Hydroxide
    b2) Aluminium trihydrate
    b3) Melamine cyanurate
    b4) and optionally a phosphate ester flame retardant Preferably, the thermoplastic polyester elastomer is a copolyetherester elastomer.

Preferably, the amount of flame retardants b) (i.e. b1)+b2)+b3)+b4)) is from about 20 to about 50 weight percent, based on the total weight of the flame retardant polymer composition.

In one embodiment, the amount of magnesium hydroxide b1) is lower than or equal to 30 weight percent, based on the total weight of the flame retardant polymer composition.

In another embodiment, the amount of aluminium trihydrate b2) is lower than or equal to 30 weight percent, based on the total weight of the flame retardant polymer composition.

In still another embodiment, the amount of melamine cyanurate b3) is from about 10 to about 20 weight percent, based on the total weight of the flame retardant polymer composition.

In a preferred embodiment, the amount of the phosphate ester flame retardant b4) is lower than or equal to 15 weight percent, based on the total weight of the flame retardant polymer composition and the phosphate ester flame retardant b4) is resorcinol bis(di-2,6-dimethylphenyl phosphate).

In an even more preferred embodiment, the flame retardant polymer composition according to the present invention comprises a flame retardant mixture b) comprising magnesium hydroxide b1) which is present in the flame retardant polymer composition in an amount from at or about 1 to 30 weight percent based on the total weight of the flame retardant polymer composition, aluminium trihydrate b2) which is present in the flame retardant polymer composition in an amount from at or about 1 to 30 weight percent based on the total weight of the flame retardant polymer composition, melamine cyanurate b3) which is present in the flame retardant polymer composition in an amount from at or about 10 to 30 weight percent based on the total weight of the flame retardant polymer composition and a phosphate ester flame retardant b4) which is present in the flame retardant polymer composition in an amount from at or about 0 to 15 weight percent based on the total weight of the flame retardant polymer composition. Preferably the organic phosphate ester b4) is resorcinol bis(di-2,6-dimethylphenyl phosphate) and preferably it is present in the above flame retardant polymer composition in an amount of from about 2 to about 12 weight percent.

Also described herein are molded, extruded, or shaped articles comprising the flame retardant polymer composition described above. Further described herein are wires, cables or optical cables comprising a coating made of the flame retardant polymer compositions of the present invention.

Also described is the use of the flame retardant polymer composition according to the present invention for making insulated wires and/or cables.

Also disclosed herein are flame retardant polymer compositions having a maximum smoke density Ds,m of about less than or equal to 300 and a VOF4 of about less than or equal to 300, as measured according to ASTM E662 Flaming Mode, and flame retardant polymer composition having a minimum light transmittance of greater than or about 60%, as measured according to IEC61034.

DETAILED DESCRIPTION OF THE INVENTION

The following definitions are to be used to interpret the meaning of the terms discussed in the description and recited in the claims.

As used herein, the article "a" indicates one as well as more than one and does not necessarily limit its referent noun to the singular.

As used herein, the terms "about" and "at or about" mean that the amount or value in question may be the value designated or some other value that is approximately or about the same. The phrase is intended to convey that similar values promote equivalent results or effects according to the invention.

The one or more thermoplastic elastomers suitable for use in the flame retardant compositions described herein are preferably present in the compositions of the invention in an amount from at or about 40 to at or about 80 weight percent, the weight percentage being based on the total weight of the flame retardant polymer composition.

Preferably, the one or more thermoplastic elastomers in the flame retardant compositions described herein include those defined in ISO 18064:2003(E). Thermoplastic elastomers defined in ISO 18064:2003(E) include copolyester thermoplastic elastomers (TPC), thermoplastic polyamide copolymers (TPA), thermoplastic polyolefinic elastomers (TPO), styrenic thermoplastic elastomers (TPS), thermoplastic polyurethanes (TPU), and mixtures of these.

Copolyester thermoplastic elastomers (TPC) include copolyesterester elastomers or copolycarbonateester elastomers, copolyesterester urethane elastomers, and copolyetherester elastomers, the latter being preferred.

Copolyesterester elastomers are block copolymers containing a) hard polyester segments and b) soft and flexible polyester segments. Examples of hard polyester segments are polyalkylene terephthalates and poly(cyclohexanedicarboxylic acid cyclohexanemethanol). Examples of soft polyester segments are aliphatic polyesters, including polybutylene adipate, polytetramethyladipate and polycaprolactone.

The copolyesterester elastomers contain blocks of ester units of a high melting polyester and blocks of ester units of a low melting polyester which are linked together through ester groups and/or urethane groups. Copolyesterester elastomers comprising urethane groups may be prepared by reacting the different polyesters in the molten phase, after which the resulting copolyesterester is reacted with a low molecular weight polyisocyanate such as for example diphenylmethylene diisocyanate.

Copolycarbonateester elastomers are block copolymers containing a) hard segments consisting of blocks of an aromatic or semi-aromatic polyester and b) soft segments consisting of blocks of a polycarbonate-containing polymeric component. Suitably, the copolycarbonateester elastomer comprises hard polyester segments made up of repeating units derived from an aromatic dicarboxylic acid and an aliphatic diol, and soft segments comprising repeating units of an aliphatic carbonate, and/or soft segments comprising randomly distributed repeating units of an aliphatic carbonate and either an aliphatic diol and an aliphatic dicarboxylic acid or a lactone, or a combination thereof, wherein the hard segments and the soft segments can be connected with a urethane group. These elastomers and their preparation are described in, e.g., EP Pat. No. 0846712.

Copolyetherester elastomers are the preferred thermoplastic elastomers in the flame retardant compositions of the present invention and have a multiplicity of recurring long-chain ester units and short-chain ester units joined through head-to-tail through ester linkages, said long-chain ester units being represented by formula (A):

and said short-chain ester units being represented by formula (B):

wherein

G is a divalent radical remaining after the removal of terminal hydroxyl groups from poly(alkylene oxide)glycols having a number average molecular weight of between about 400 and about 6000, or preferably between about 400 and about 3000;

R is a divalent radical remaining after removal of carboxyl groups from a dicarboxylic acid having a molecular weight of less than about 300;

D is a divalent radical remaining after removal of hydroxyl groups from a diol having a molecular weight less than about 250.

As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxy groups and having a number average molecular weight of from about 400 to about 6000, and preferably from about 600 to about 3000. Preferred poly(alkylene oxide) glycols include poly(tetramethylene oxide) glycol, poly(trimethylene oxide) glycol, poly(propylene oxide) glycol, poly(ethylene oxide) glycol, copolymer glycols of these alkylene oxides, and block copolymers such as ethylene oxide-capped poly(propylene oxide) glycol. Mixtures of two or more of these glycols can be used.

As used herein, the term "short-chain ester units" as applied to units in a polymer chain of the copolyetheresters refers to low molecular weight compounds or polymer chain units having molecular weights less than about 550. They are made by reacting a low molecular weight diol or a mixture of diols (molecular weight below about 250) with a dicarboxylic acid to form ester units represented by Formula (B) above. Included among the low molecular weight diols which react to form short-chain ester units suitable for use for preparing copolyetheresters are acyclic, alicyclic and aromatic dihydroxy compounds. Preferred compounds are diols with about 2 to 15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, and the like. Especially preferred diols are aliphatic diols containing 2 to 8 carbon atoms, and a more preferred diol is 1,4-butanediol. Included among the bisphenols which can be used are bis(p-hydroxy)diphenyl, bis(p-hydroxyphenyl)methane, and bis(p-hydroxyphenyl)propane. Equivalent ester-forming derivatives of diols are also useful (e.g., ethylene oxide or ethylene carbonate can be used in place of ethylene glycol and resorcinol diacetate can be used in place of resorcinol).

As used herein, the term "diols" includes equivalent ester-forming derivatives such as those mentioned. However, any molecular weight requirements refer to the corresponding diols, not their derivatives.

Dicarboxylic acids that can react with the foregoing long-chain glycols and low molecular weight diols to produce the copolyetheresters are aliphatic, cycloaliphatic or aromatic dicarboxylic acids of a low molecular weight, i.e., having a molecular weight of less than about 300. The term "dicarboxylic acids" as used herein includes functional equivalents of dicarboxylic acids that have two carboxyl functional groups that perform substantially as dicarboxylic acids in reaction with glycols and diols in forming copolyetherester polymers. These equivalents include esters and ester-forming derivatives such as acid halides and anhydrides. The molecular weight requirement pertains to the acid and not to its functionally equivalent ester or ester-forming derivative.

Thus, an ester of a dicarboxylic acid having a molecular weight greater than 300 or another functional equivalent of a dicarboxylic acid having a molecular weight greater than 300 are included provided the corresponding acid has a molecular weight below about 300. The dicarboxylic acids can contain any substituent groups or combinations that do not substantially interfere with copolyetherester polymer formation or with the use of the copolyetherester polymer in the flame retardant compositions of the invention.

As used herein, the term "aliphatic dicarboxylic acids" refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

As used herein, the term "aromatic dicarboxylic acids" refer to dicarboxylic acids having two carboxyl groups each attached to a carbon atom in a carbocyclic aromatic ring structure. It is not necessary that both functional carboxyl groups be attached to the same aromatic ring and, where more than one ring is present, they can be joined by aliphatic or aromatic divalent radicals or divalent radicals such as —O— or —$SO_2$—. Representative useful aliphatic and cycloaliphatic acids include sebacic acid; 1,3-cyclohexane dicarboxylic acid; 1,4-cyclohexane dicarboxylic acid; adipic acid; glutaric acid; 4-cyclohexane-1,2-dicarboxylic acid; 2-ethylsuberic acid; cyclopentanedicarboxylic acid, decahydro-1,5-naphthylene dicarboxylic acid; 4,4'-bicyclohexyl dicarboxylic acid; decahydro-2,6-naphthylene dicarboxylic acid; 4,4'-methylenebis-(cyclohexyl) carboxylic acid; and 3,4-furan dicarboxylic acid. Preferred acids are cyclohexane dicarboxylic acids and adipic acid.

Representative aromatic dicarboxylic acids include phthalic, terephthalic and isophthalic acids; dibenzoic acid; substituted dicarboxy compounds with two benzene nuclei such as bis(p-carboxyphenyl) methane; p-oxy-1,5-naphthalene dicarboxylic acid; 2,6-naphthalene dicarboxylic acid; 2,7-naphthalene dicarboxylic acid; 4,4'-sulfonyl dibenzoic acid; and $C_1$-$C_{12}$ alkyl and ring substitution derivatives of these acids, such as halo, alkoxy, and aryl derivatives. Hydroxy acids such as p-(beta-hydroxyethoxy)benzoic acid can also be used provided an aromatic dicarboxylic acid is also used.

Aromatic dicarboxylic acids are a preferred class for preparing the copolyetherester elastomers useful for this invention. Among the aromatic acids, those with 8 to 16 carbon atoms are preferred, particularly terephthalic acid alone or in a mixture with phthalic and/or isophthalic acids.

The copolyetherester elastomer preferably comprises from at or about 15 to at or about 99 weight percent short-chain ester units corresponding to Formula (B) above, the remainder being long-chain ester units corresponding to Formula (A) above, wherein 100 weight percent is the sum of the weight percentages of the units of Formula (A) and Formula (B) in the copolyetherester elastomer. More preferably, the copolyetherester elastomers comprise from at or about 20 to at or about 95 weight percent, and even more preferably from at or about 50 to at or about 90 weight percent short-chain ester units, where the remainder is long-chain ester units. More preferably, at least about 70% of the groups represented by R in Formulae (A) and (B) above are 1,4-phenylene radicals and at least about 70% of the groups represented by D in Formula (B) above are 1,4-butylene radicals and the sum of the percentages of R groups which are not 1,4-phenylene radicals and D groups that are not 1,4-butylene radicals does not exceed 30% of the total number of R and D groups. If a second dicarboxylic acid is used to prepare the copolyetherester, isophthalic acid is preferred and if a second low molecular weight diol is used, ethylene glycol, 1,3-propanediol, cyclohexanedimethanol, or hexamethylene glycol are preferred.

A blend or mixture of two or more copolyetherester elastomers can be used. The copolyetherester elastomers used in the blend need not on an individual basis come within the values disclosed hereinbefore for the elastomers. However, the blend of two or more copolyetherester elastomers must conform to the values described herein for the copolyetheresters on a weighted average basis. For example, in a mixture that contains equal amounts of two copolyetherester elastomers, one copolyetherester elastomer can contain 60 weight percent short-chain ester units and the other resin can contain 30 weight percent short-chain ester units for a weighted average of 45 weight percent short-chain ester units.

Preferred copolyetherester elastomers include, but are not limited to, copolyetherester elastomers prepared from monomers comprising (1) poly(tetramethylene oxide) glycol; (2) a dicarboxylic acid selected from isophthalic acid, terephthalic acid and mixtures thereof; and (3) a diol selected from 1,4-butanediol, 1,3-propanediol and mixtures thereof, or from monomers comprising (1) poly(trimethylene oxide) glycol; (2) a dicarboxylic acid selected from isophthalic acid, terephthalic acid and mixtures thereof; and (3) a diol selected from 1,4-butanediol, 1,3-propanediol and mixtures thereof, or from monomers comprising (1) ethylene oxide-capped poly(propylene oxide) glycol; (2) a dicarboxylic acid selected from isophthalic acid, terephthalic acid and mixtures thereof; and (3) a diol selected from 1,4-butanediol, 1,3-propanediol and mixtures thereof.

Preferably, the copolyetherester elastomers described herein are prepared from esters or mixtures of esters of terephthalic acid and/or isophthalic acid, 1,4-butanediol and poly(tetramethylene ether)glycol or poly(trimethylene ether) glycol or ethylene oxide-capped polypropylene oxide glycol, or are prepared from esters of terephthalic acid, e.g., dimethylterephthalate, 1,4-butanediol and poly(ethylene oxide)glycol. More preferably, the copolyetheresters are prepared from esters of terephthalic acid, e.g., dimethylterephthalate, 1,4-butanediol and poly(tetramethylene ether)glycol.

As a result of their excellent tear strengths, tensile strengths, flex lives, abrasion resistances, and broad useful end-use temperature ranges, thermoplastic polyetherester elastomers are used in a wide range of applications including for example wire and cable coatings, automotive applications, components for household appliances, components for buildings or mechanical devices and tubes and pipes for conveying fluids. Examples of suitable copolyetherester elastomers are commercially available under the trademark Hytrel® from E. I. du Pont de Nemours and Company, Wilmington, Del.

Thermoplastic polyamide copolymers (TPA's) consist of copolymers containing a) hard polyamide segments and b) soft and flexible segments. Examples of TPA's include polyesteramides (PEA's), polyetherester-amides (PEEA's), polycarbonate-esteramides (PCEA's) and polyether-block-amides (PE-b-A's). Preferably, the TPA consists of a linear and regular chain of polyamide segments and flexible polyether or polyester segments or soft segments with both ether and ester linkages as represented by formula (C):

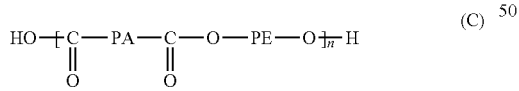

(C)

wherein

"PA" represents a polyamide sequence and "PE" represents for example a polyoxyalkylene sequence formed from linear or branched aliphatic polyoxyalkylene glycols or a long-chain polyol with either ether or ester or both linkages and mixtures thereof or a copolyether or copolyester sequence derived therefrom. The polyamide may be aliphatic or aromatic. The softness of the copolyetheramide or the copolyesteramide block copolymers generally decreases as the relative amount of polyamide units is increased. Examples of thermoplastic polyamide block copolymers suitable for use in the compositions of the invention are commercially available from Arkema, Inc. (formerly Atofina or Elf Atochem) of King of Prussia, Pa., under the trademark Pebax™.

Thermoplastic polyolefinic elastomers (TPO's) consist of certain rubbery olefin-type polymers, for example propylene or polyethylene, as well as thermoplastics blended with a rubber. Examples of thermoplastic polyolefinic elastomers (TPO's) include random block copolymers such as alpha-olefin copolymers, including ethylene-propylene copolymers (EPM), ethylene propylene diene copolymers (EPDM), copolymers of ethylene or propylene or butene with higher alpha-olefin copolymers (e.g. ethylene-hexene, ethylene-octene (for example Engage™ which is commercially available from The Dow Chemical Co. of Midland, Mich.)); random stereoblock polypropylene; hydrogenated diene block copolymers such as hydrogenated polybutadiene and hydrogenated polyisoprene, a mixture of hydrogenated polybutadiene and polybutadiene; graft copolymers such as EPDM-g-polypivalolactone (PPVL). Other examples are polyolefin blend thermoplastic elastomers such as for example blends of EPM or EPDM with isotactic polypropylene (iPP), and blends of EPM or EPDM with polyethylene and polypropylene.

Styrenic thermoplastic elastomers (TPS's) consist of block copolymers of styrene and rubbery polymeric materials like for example polybutadiene (TPS-SBS), a mixture of hydrogenated polybutadiene and polybutadiene, poly(ethylene-butylene) (TPS-SEBS), polyisoprene (TPS-SIS) and poly(ethylene-propylene) (TPS-SEPS).

Thermoplastic polyurethanes (TPU's) consist of linear segmented block copolymer composed of hard segments comprising polyisocyanate and a chain extender and soft segments comprising diisocyanate and a long chain polyol as represented by the general formula (D):

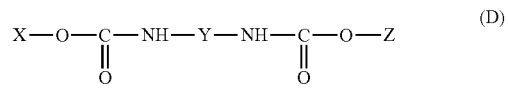

(D)

wherein

"X" represents a hard segment comprising a polyisocyanate and a chain extender, preferably a short-chain glycol, "Z" represents a soft segment comprising a polyisocyanate and a long-chain polyol and "Y" represents the residual group of the polyisocyanate compound of the urethane bond linking the X and Z segments. Preferably, the polyisocyanate is a diisocyanate. Examples of diisocyanate are 4,4'-diphenylmethane diisocyanate (MDI), toluene diisocyanate (TDI), hexamethylene diisocyanate (HDI), 4,4'-dicyclohexylmethane diisocyanate (H12-MDI), trans-trans-4,4'-dicyclohexylmethane diisocyanate, 3,3'-dimethyl-4,4'-biphenyl diisocyanate (TODI) and 1,4-benzene diisocyanate. The long-chain polyol includes those of a polyether type such as poly(alkylene oxide)glycol or those of polyester type.

Flame Retardants

Flame retardance in the flame retardant thermoplastic elastomer compositions described herein is imparted by flame retardant mixtures also referred herein as flame retardant compositions. These flame retardant mixtures b) comprise a flame retardant b1) which is magnesium hydroxide. As an alternative to magnesium hydroxide, other carbonates, basic and amphoteric oxides, hydroxides (other than aluminium hydroxide), stannates, and mixtures of two or more of any of the flame retardants b1) can be used in the flame retardant mixtures of the present invention.

Preferably, the flame retardant mixtures b) comprise a flame retardant b1) in an amount from at or about 1 to at or about 30 weight percent, more preferably in an amount from at or about 5 to at or about 20 weight percent and even more preferably in an amount from at or about 7 to at or about 15 weight percent, the weight percentage being based on the total weight of the flame retardant polymer composition.

The flame retardant mixtures of the present invention also comprise aluminium trihydrate as component b2). Preferably, the flame retardant mixtures b) comprise a flame retardant b2) in an amount from at or about 1 to at or about 30 weight percent, more preferably in an amount from at or about 5 to at or about 20 weight percent and even more preferably in an amount from at or about 7 to at or about 15 weight percent, the weight percentage being based on the total weight of the flame retardant polymer composition. Aluminium oxide could be used as an alternative to aluminium trihydrate.

The flame retardant polymer mixtures of the invention also comprise melamine cyanurate as component b3). Melamine cyanurate, also known as melamine-cyanuric acid adduct or melamine-cyanuric acid complex, is a crystalline complex formed from a 1:1 mixture of melamine and cyanuric acid. Melamine cyanurate is the commonly used name for adducts of 2,4,6-triamino-1,3,5-triazine (melamine) and 2,4,6-trihydroxy-1,3,5-triazine or its tautomer ((iso)cyanuric acid) as described for example in U.S. Pat. No. 4,180,496.

Preferably, the amount of melamine cyanurate present in the flame retardant polymer composition of the present invention is higher than or equal to 10 weight percent based on the total weight of the flame retardant polymer composition. Lower amounts may not be effective to impart flame retardance to the polymer composition. More preferably, the amount of melamine cyanurate present in the flame retardant polymer composition of the present invention is from 10 to 30 weight percent, even more preferably from 15 to 25 weight percent, the weight percent being based on the total weight of the flame retardant polymer composition. Amounts higher than 30 weight percent may be detrimental to the mechanical properties of the flame retardant polymer composition.

In contrast to many flame retardant polymer compositions described in the art, the flame retardant polymer compositions of the present invention are free of organic or inorganic phosphinate flame retardant derivatives, such as those described in U.S. Pat. No. 6,255,371 (e.g., aluminium diethylphosphinate) and in U.S. Pat. No. 7,700,680 (e.g., aluminium phosphinate).

The flame retardant polymer compositions of the present invention may further comprise one or more phosphate ester flame retardants b4), such as those described in EP Pat. No. 0 947 547. Preferred phosphate ester flame retardants are selected from the group consisting of resorcinol bis(di-2,6-dimethylphenyl phosphate), also referred as tetrakis(2,6-dimethylphenyl)-m-phenylene biphosphate (CAS number 139189-30-3) described in Japanese Kokai H9-143350 and available under the tradename PX-200 from the Daihachi Chemical Industry Corporation of Osaka, Japan, and bisphenol bis(di-2,6-dimethylphenyl phosphate), also available from Daihachi under the tradename PX-202.

When used, the preferred amount of phosphate ester flame retardant present in the flame retardant polymer composition of the present invention is lower than or equal to 15 weight percent, based on the total weight of the flame retardant polymer composition. More preferably, the amount of phosphate ester flame retardant present in the flame retardant polymer composition of the present invention is from 2 to 12 weight percent based on the total weight of the flame retardant polymer composition. It has been found that amounts higher to 15 weight percent of phosphate ester flame retardants, notably of resorcinol bis(di-2,6-dimethylphenyl phosphate), may be detrimental to the mechanical properties of the flame retardant polymer composition, in particular to the flexibility of the polymer composition, and may also be detrimental to low smoke emission of the polymer composition.

Alternatively, phosphate flame retardants of formula (I) may also be used in the in the flame retardant polymer composition of the present invention.

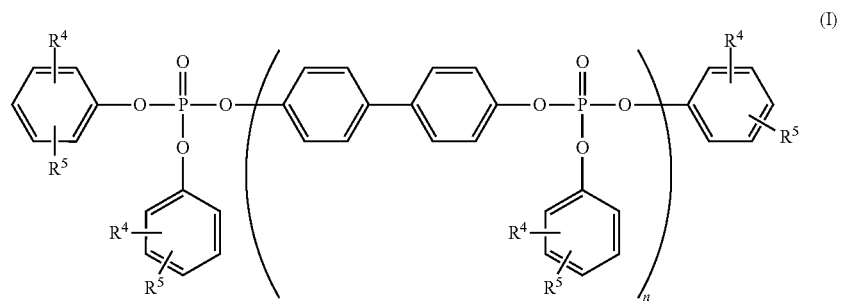

(I)

wherein $R^4$ and $R^5$ each independently represent a hydrogen atom or a methyl group and n represents a number of 1 to 5.

Preferably, $R^4$ and $R^5$ represent a hydrogen atom.

The phosphate ester flame retardant b4) may be a mixture of the monomers or oligomers of compound of formula (I), e.g., a mixture of compounds wherein n is equal to 1 and one or more compounds wherein n is equal to 2, 3, 4 or 5.

Phosphate ester flame retardants useful in the present invention may be obtained according to the processes described in U.S. Patent Appln. Publn. No. 2011/0084242, for example, or under CAS number 1003300-73-9 from Adeka Palmarole of Mulhouse, France.

The flame retardant polymer compositions described herein may further comprise additives that include, but are not limited to, one or more of the following components as well as combinations of these: metal deactivators, such as hydrazine and hydrazide; heat stabilizers; antioxidants; modifiers; colorants; lubricants; fillers and reinforcing agents; impact modifiers; flow enhancing additives; antistatic agents; crystallization promoting agents; conductive additives; viscosity modifiers; nucleating agents; plasticizers; mold release agents; scratch and mar modifiers; drip suppressants; adhesion modifiers; and other processing aids known in the polymer compounding art. When used, these additives are preferably present in amounts of about 0.1 to about 20 weight percent, based on the total weight of the flame retardant polymer composition.

The flame retardant compositions described herein may further comprise agents that increase softness, such as poly(alkyl(meth)acrylate) or polyethylene/(allkyl (meth) acrylate) or polethylene/vinyl acetate. As used herein, the term "(meth)acrylate" refers to methacrylate and/or acrylate and the term "poly(meth)acrylate" refers to polymers derived from the polymerization of methacrylate and/or acrylate monomers. The acrylate rubber may be prepared by copolymerizing one or more alkyl (meth)acrylate monomers with one or more olefins. A preferred olefin is ethylene. Preferably, the acrylate rubbers include poly(alkyl (meth) acrylate) rubbers, ethylene/alkyl (meth)acrylate copolymer rubbers and poly(perfluoroalkyl (meth)acrylate) rubbers. More preferably, the acrylate rubbers are ethylene/alkyl (meth)acrylate copolymer rubbers where the alkyl group has from 1 to 4 carbons. Preferred ethylene/alkyl (meth)acrylate copolymers are those derived from less than about 80 weight percent of copolymerized ethylene and more than about 20 weight percent of copolymerized alkyl (meth)acrylate, based on the total weight of the ethylene/alkyl (meth)acrylate copolymer. The alkyl acrylate or vinyl acetate polymers may optionally comprise additional repeat units derived from one or more functionalized comonomers, such as (meth)acrylate, glycidyl esters, such as glycidyl methacrylate, maleic acid, or other comonomers having one or more reactive groups including acid, anhydride, hydroxyl, epoxy, isocyanates, amine, oxazoline, chloroacetate, carbon monoxide or diene functionality. The acrylate rubbers may also be prepared from more than two alkyl (meth)acrylate monomers. Examples are acrylate rubbers made by polymerizing ethylene, methyl acrylate, and a second alkyl acrylate, such as butyl acrylate.

The additives described above may be present in the flame retardant polymer compositions of the invention in amounts and in forms known in the art, including in the form of so-called nanomaterials where at least one of the dimensions of the particles is in the range of 1 to 1000 nm. The flame retardant polymer compositions described herein are melt-mixed blends, wherein all of the polymeric components are preferably well-dispersed within each other and all of the non-polymeric ingredients are preferably well-dispersed in and bound by the polymer matrix, such that the blend forms a unified whole. Any melt-mixing method may be used to combine the polymeric components and non-polymeric ingredients of the present invention.

The polymeric components and non-polymeric ingredients of the flame retardant polymer compositions of the invention may be added to a melt mixer, such as, for example, a single or twin-screw extruder; a blender; a single or twin-screw kneader; or a Banbury mixer, either simultaneously through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained. When long-length fillers such as for example long glass fibers are used in the composition, pultrusion may be used to prepare a reinforced composition.

The components of the flame retardant mixture may be combined by mixing in a blender, Banbury mixer, roll mill, or any method for mixing and dispersing chemical compounds known to those skilled in the art, so long as the method does not result in degradation of the components. The components of the flame retardant mixture may also be blended individually with the additives and/or the thermoplastic elastomer by a method that does not degrade the ingredients of the flame retardant mixture, for example in a Banbury mixer or an extruder.

Also described herein are methods for imparting flame retardance and low smoke emission to an article made of a flame retardant polymer composition, the method comprising melt blending a) the one or more thermoplastic elastomers described herein with a flame retardant composition comprising b1) magnesium hydroxide, b2) aluminium trihydrate; b3) melamine cyanurate and b4) a phosphate ester flame retardant which is preferably resorcinol bis(di-2,6-dimethylphenyl phosphate), wherein the flame retardant composition is present in an amount from at or about 20 to at or about 50 weight percent (the weight percentage being based on the total weight of the flame retardant polymer composition), b1) is present in the flame retardant composition in an amount from at or about 1 to at or about 30 weight percent, b2) is present in the flame retardant composition in an amount from at or about 1 to at or about 30 weight percent, b3) is present in the flame retardant composition in an amount from at or about 10 to at or about 30 weight percent, and b4) is present in the flame retardant composition in an amount from at or about 0 to at or about 15 weight percent, the weight percent being based on the total weight of the flame retardant polymer composition.

Also described herein are methods for imparting flame retardance and low smoke emission to an article made of a flame retardant polymer composition, the method comprising melt blending the flame retardant mixture b1) to b4) and the one or more thermoplastic elastomers described herein.

The flame retardant polymer compositions described herein may be shaped into articles using methods known to those skilled in the art, such as injection molding, blow molding, injection blow molding, extrusion, thermoforming, melt casting, vacuum molding, rotational molding, calendar molding, slush molding, filament extrusion and fiber spinning. Such articles may include films, fibers and filaments, wire and cable coatings; photovoltaic cable coatings, optical fiber coatings, tubing and pipes; fabrics or texiles made fibers and filaments, e.g., used in clothing or carpets; films and membranes such breathable membranes in roofing and building/construction; motorized vehicle parts such as body panels, air bag doors, dashboards, engine covers, rocker panels or air filter covers; components for household appliances, such as washers, dryers, refrigerators and heating-ventilation-air conditioning appliances; connectors in electrical/electronic applications; components for electronic devices, such as computers; components for office-, indoor-, and outdoor-furniture; and footwear components.

EXAMPLES

The invention is further illustrated by certain embodiments in the examples below which provide greater detail for the compositions, uses and processes described herein.

The following materials were used to prepare the flame retardant polymer compositions described herein and the compositions of the comparative examples.

Copolyester Thermoplastic Elastomer (TPC): a copolyetherester elastomer comprising about 44.9 weight percent of poly(tetramethylene oxide) having an average molecular weight of about 1000 g/mol as polyether block segments, the weight percentage being based on the total weight of the copolyetherester elastomer, the short chain ester units of the copolyetherester being polybutylene terephthalate and polybutylene isophthalate segments. As required for the manufacturing process and well-known to those skilled in the art, the copolyetherester elastomer contained up to 6 weight percent of heat stabilizers, antioxidants and metal deactivators.

Magnesium Hydroxide Flame Retardant (MDH): Kisuma 5A, supplied by Kisuma Chemicals of Veendam, The Netherlands.

Aluminum Trihydroxide flame retardant (ATH): Hydral 710, supplied by J.M. Huber Corporation of Edison, N.J.

Melamine cyanurate flame retardant (MC): Melapur® MC-15, melamine cyanurate, having a D98 max of 15 μm supplied by the BASF Corporation of Basel, Switzerland.

Phosphinate flame retardant: Exolit® OP1230, an aluminum salt of diethylene phosphinate supplied by the Clariant Corporation of Frankfurt, Germany.

Phosphate: PX-200, a Resorcinol bis(di-2,6-dimethylphenyl phosphate), supplied by Daihachi Chemical Industry Corporation of Osaka, Japan.

In the Tables 1-2, compositions of the Examples are identified as "E" and compositions of the Comparative Examples are identified as "C".

Test Methods

Flame retardant polymer compositions of the invention and comparative compositions were prepared as follows: The above described materials, in the amounts listed in Tables 1 and 2, were melt blended in a twin screw extruder. The compounded melt blended mixtures of examples E1 to E10 and comparative examples C1 to C10 were extruded in the form of laces or strands, cooled in a water bath, chopped into granules and placed in sealed aluminum-lined bags in order to prevent exposure to adventitous moisture.

Mechanical Properties

Mechanical property measurement was conducted as follows. Prior to injection molding, the granules of the flame retardant compositions of the invention and granules from comparative compositions prepared according to the above-described method were dried to provide granulated compositions having a moisture level below 0.08 percent. Tensile stress at break and elongation at break was measured according to the method ISO 527 using injection molded ISO tensile bar 5A samples of thickness of 2 mm. The length of the tensile bars was 75 mm and the test speed was 50 mm/min.

Flame Retardance

Flammability testing was performed according to UL 94 test standard, 20 mm vertical burning test. Test specimens were formed from the compositions of the invention and from comparative compositions by injection molding the compositions in the form of test bars having dimensions of 125 mm long by 13 mm wide and a thickness of 1.6 mm. Prior to injection molding, the granules of the flame retardant compositions prepared according to the above-described method were dried to provide granulated compositions having a moisture level below 0.08 percent. Before measurement, the test specimens were conditioned for 48 hours at 23° C. and 50% relative humidity. Test specimens were clamped with the longitudinal axis of the specimen in the vertical direction, so that the lower end of the specimen was 300 mm above a horizontal layer of dry absorbent surgical cotton. A burner producing a blue flame 20 mm high was placed so that the flame was applied centrally to the mid-point of the bottom edge of the specimen for 10 seconds. After the application of the flame to the specimen for 10 seconds, the burner was withdrawn from the sample and the after-flame time, t1, was measured. When after-flaming of the test specimen ceased, the burner was again placed beneath the specimen for an additional 10 seconds. The flame was then withdrawn from the test specimen and the second after-flame time, t2, was measured. Materials are classified according to the test specifications as V-0, V-1 or V-2, based on the behavior of the material during burning, V-2 being the least demanding classification. When the composition failed to meet the criteria for the least demanding classification (V-2), it is reported as "failed" in the tables.

Smoke Emission Method

Equipment and Set-Up Method Smoke emission from the compositions described in Tables 1 and 2 was measured according to the standard method ASTM E662 flaming mode. Test specimens, in the shape of rectangular plaques of dimension 75×75 mm wide, and having a thickness of 2 mm were molded from the thus-obtained extruded materials. The test was carried out in an NBS smoke chamber supplied by Fire Testing Technology Ltd of East Grinstead, England. The results are expressed as specific optical density, Ds. The smoke chamber test results in a curve of specific optical density versus time. In Tables 1 and 2 the following parameters measured describe the smoke emission performance of the materials.

Ds,m: maximum specific optical density measured over an experiment duration of 20 minutes.

VOF4: is the area under the Ds versus time curve during the period t=0 to t=4 min.

TABLE 1

|  | E1 | E2 | E3 | E4 | E5 | E6 | C1 | C2 | C3 | C4 | C5 |
|---|---|---|---|---|---|---|---|---|---|---|---|
| TPC | 65.4 | 59.4 | 57.4 | 57.4 | 57.4 | 57.4 | 67.4 | 70.9 | 57.4 | 70.9 | 70.9 |
| ATH | 13.5 | 13.5 | 13.5 | 17.3 | 6.8 | 3 | 6.8 | 4.5 |  |  | 6.8 |
| MDH | 6.8 | 6.8 | 6.8 | 3 | 13.5 | 17.3 | 3.5 | 2.3 | 20.3 | 6.8 |  |
| MC | 12 | 18 | 20 | 20 | 20 | 20 | 20 | 20 | 20 | 20 | 20 |
| Stabilisers/Antidrip agents | 2.3 | 2.3 | 2.3 | 2.3 | 2.3 | 2.3 | 2.3 | 2.3 | 2.3 | 2.3 | 2.3 |
| Total (weight percent) | 100 | 100 | 100 | 100 | 100 | 100 | 100 | 100 | 100 | 100 | 100 |
| Tensile Stress at break (MPa) | 13 | 10 | 10 | 10 | 11 | 10 | 13 | 16 | 11 | 11 | 13 |
| Elongation at break (%) | 240 | 90 | 50-90 | 60 | 50 | 90 | 350 | 380 | 50 | 180 | 300 |
| Ds, m | 70 | 70 | 70 | 90 | 150 | 60 | 120 | 200 | 240 | 100 | 430 |
| VOF4 | 100 | 10 | 20 | 45 | 10 | 5 | 200 | 400 | 5 | 140 | 700 |
| UL-V rating 1.6 mm | V2 | V2 | V2 | V2 | V2 | V2 | Failed | Failed | Failed | Failed | Failed |

TABLE 2

| | E7 | E8 | E9 | E10 | C6 | C7 | C8 | C9 | C10 |
|---|---|---|---|---|---|---|---|---|---|
| TPC | 59.4 | 54.4 | 53.4 | 47.4 | 47.4 | 60.9 | 39.4 | 60.9 | 47.4 |
| ATH | 13.5 | 13.5 | 13.5 | 13.5 | | 6.8 | 13.5 | | 13.5 |
| MDH | 6.8 | 6.8 | 6.8 | 6.8 | 20.3 | | 6.8 | 6.8 | 6.8 |
| Phosphinate | | | | | | | | | 12 |
| MC | 18 | 18 | 12 | 18 | 18 | 18 | 18 | 18 | 18 |
| Phosphate | | 5 | 12 | 12 | 12 | 12 | 20 | 12 | |
| Stabilisers/Antidrip agents | 2.3 | 2.3 | 2.3 | 2.3 | 2.3 | 2.3 | 2.3 | 2.3 | 2.3 |
| Total (weight percent) | 100 | 100 | 100 | 100 | 100 | 100 | 100 | 100 | 100 |
| Tensile Stress at break (MPa) | 10 | 8 | 11 | 10 | 9 | 15 | 6 | 14 | 9.3 |
| Elongation at break (%) | 90 | 130 | 400 | 200 | 150 | 400 | 340 | 400 | 8 |
| Ds, m | 70 | 230 | 200 | 300 | 430 | 600 | 330 | 400 | Degradation |
| VOF4 | 10 | 220 | 260 | 140 | 220 | 1000 | 320 | 700 | |
| UL-V rating 1.6 mm | V2 | V2 | V2 | V2 | V2 | V2 | V0 | V2 | |

The invention claimed is:

1. A halogen-free flame retardant polymer composition comprising:
   a) one or more thermoplastic elastomers; and
   b) a flame retardant mixture comprising:
      b1) magnesium hydroxide;
      b2) aluminium trihydrate;
      b3) melamine cyanurate;
      b4) and optionally a phosphate ester flame retardant;
   wherein the one or more thermoplastic elastomers are copolyetherester elastomers;
   wherein the amount of the one or more thermoplastic elastomers is from about 40 weight percent to about 80 weight percent;
   wherein the sum of the amount of b1) and the amount of b2) is lower than or equal to about 20 weight percent;
   and wherein the amount of the optional phosphate ester flame retardant b4), when present, is lower than or equal to 15 weight percent; and
   wherein the weight percentages are based on the total weight of the flame retardant polymer composition.

2. The halogen-free flame retardant polymer composition of claim 1, wherein the one or more thermoplastic elastomers are copolyetherester elastomers having a multiplicity of recurring long-chain ester units and short-chain ester units joined head-to-tail through ester linkages, said long-chain ester units being represented by formula (A):

(A)

and said short-chain ester units being represented by formula (B):

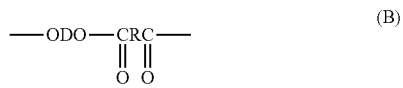

(B)

wherein:
G is a divalent radical remaining after the removal of terminal hydroxyl groups from poly(alkylene oxide) glycols having a number average molecular weight of between about 400 and about 6000;
R is a divalent radical remaining after removal of carboxyl groups from a dicarboxylic acid having a molecular weight of less than about 300; and
D is a divalent radical remaining after removal of hydroxyl groups from a diol having a molecular weight less than about 250.

3. The halogen-free flame retardant polymer composition of claim 1, wherein the one or more thermoplastic elastomers are copolyetherester elastomers prepared from monomers comprising (1) poly(tetramethylene oxide) glycol; (2) a dicarboxylic acid selected from the group consisting of isophthalic acid, terephthalic acid and mixtures thereof; and (3) a diol selected from the group consisting of 1,4-butanediol, 1,3-propanediol and mixtures thereof.

4. The halogen-free flame retardant polymer composition of claim 1, wherein the one or more thermoplastic elastomers are copolyetherester elastomers prepared from monomers comprising (1) poly(trimethylene oxide) glycol; (2) a dicarboxylic acid selected from the group consisting of isophthalic acid, terephthalic acid and mixtures thereof; and (3) a diol selected from the group consisting of 1,4-butanediol, 1,3-propanediol and mixtures thereof.

5. The halogen-free flame retardant polymer composition of claim 1, wherein the one or more thermoplastic elastomers are copolyetherester elastomers prepared from monomers comprising (1) ethylene oxide-capped poly(propylene oxide) glycol; (2) dicarboxylic acids selected from the group consisting of isophthalic acid, terephthalic acid and mixtures thereof; and (3) a diol selected from the group consisting of 1,4-butanediol, 1,3-propanediol and mixtures thereof.

6. The halogen-free flame retardant polymer composition of claim 1, wherein the amount of flame retardants b1) to b4) is from about 20 to about 50 weight percent, based on the total weight of the flame retardant polymer composition.

7. The halogen-free flame retardant polymer composition of claim 1, wherein the amount of b3) is from about 10 to about 30 weight percent, based on the total weight of the flame retardant polymer composition.

8. The halogen-free flame retardant polymer composition of claim 1, wherein the phosphate ester flame retardant b4) is resorcinol bis(di-2,6-dimethylphenyl phosphate).

9. The halogen-free flame retardant polymer composition of claim 1, wherein the flame retardant mixture b) comprises magnesium hydroxide b1) and aluminium trihydrate b2) in a total amount of about 1 to about 20 weight percent; melamine cyanurate b3) in an amount of about 10 to 30 weight percent; and a phosphate ester flame retardant b4) in an amount of about 0 to 15 weight percent; and wherein the weight percentages of b1), b2), b3) and b4) are based on the total weight of the flame retardant polymer composition.

10. The halogen-free flame retardant polymer composition of claim 1, having a maximum smoke density Ds,m of about less than or equal to 300 and a VOF4 of about less than or equal to 300, as measured according to ASTM E662 Flaming Mode.

11. The halogen-free flame retardant polymer composition of claim 1, having a minimum light transmittance of greater than or about 60%, as measured according to IEC61034.

12. A molded, extruded, or shaped article and a fiber or a filament comprising the halogen-free flame retardant polymer composition of claim 1.

13. A wire, a cable or an optical cable comprising a coating made of the halogen-free flame retardant polymer composition of claim 1.

* * * * *